United States Patent [19]

Firester

[11] 4,022,533

[45] May 10, 1977

[54] LASER ALIGNMENT APPARATUS AND METHOD WITH AN ALIGNMENT MIRROR

[75] Inventor: Arthur Herbert Firester, Skillman, N.J.

[73] Assignee: RCA Corporation, New York, N.Y.

[22] Filed: Feb. 23, 1976

[21] Appl. No.: 660,242

[52] U.S. Cl. .............................. 356/153; 356/138
[51] Int. Cl.² .................................. G01B 11/26
[58] Field of Search .......... 350/310, 288, 285, 179; 356/138, 148, 150, 153

[56] References Cited

UNITED STATES PATENTS

| | | | |
|---|---|---|---|
| 3,438,700 | 4/1969 | Gillard | 350/285 |
| 3,534,291 | 10/1970 | Martin et al. | 350/179 |
| 3,542,478 | 11/1970 | Dessus | 356/153 |
| 3,603,688 | 9/1971 | Smith-Vaniz | 356/153 |

*Primary Examiner*—John K. Corbin
*Assistant Examiner*—John W. Henry
*Attorney, Agent, or Firm*—Glenn H. Bruestle; George E. Haas

[57] ABSTRACT

A mirror is aligned on a laser tube using an apparatus comprising a window spaced from the mirror and a means for containing fluid, such as a bellows, between the window and the mirror. The window and the fluid have an index of refraction that matches that of the mirror. The bellows permits the mirror's relation to the window to be changed without the loss of the fluid. In aligning the lasing mirror, the window is oriented normal to a light beam from an autocollimator. The mirror is then placed in contact with the laser tube and oriented so that the beam from the autocollimator is reflected back on itself.

7 Claims, 2 Drawing Figures

LASER ALIGNMENT APPARATUS AND METHOD WITH AN ALIGNMENT MIRROR

BACKGROUND OF THE INVENTION

This invention relates to apparatus and methods for aligning mirrors on the ends of a laser discharge tube.

Conventional gas lasers have a mirror at each end of a discharge tube. In order for lasing to occur, the two mirrors must be aligned parallel to one another. The laser output is enhanced by precision in the mirror alignment. This alignment process has been greatly facilitated by the use of an autocollimator. The autocollimator reflects a generated light beam off an object and indicates when the paths of the incident and reflected beams coincide.

In employing an autocollimator to align a laser, the tube is positioned so that its longitudinal axis is aligned with the path of the light beam. The beam is then directed down the length of the laser tube. A first laser mirror is placed at the far end of the laser tube and then oriented until the autocollimator indicates that the beam is being reflected back along the path of transmission. When this occurs, the mirror is normal to the light beam and therefore normal to the longitudinal axis of the tube. When this is indicated, the mirror is firmly fixed in place. A second mirror is then positioned at the near end of the laser tube with its reflective surface toward the tube. In aligning this mirror, the light beam from the autocollimator travels through the mirror substrate and is relected from the rear surface of the reflective coating on the mirror. Again the mirror is oriented until the autocollimator indicates that the paths of the incident and reflected beams coincide. Both mirrors then are normal to the longitudinal axis of the tube and parallel to one another.

One of the difficulties encountered in aligning the second laser mirror using an autocollimator is that the light must be transmitted through the second mirror substrate. The mirror substrates are not true parallelograms, i.e., the opposite surfaces are not perfectly parallel. In fact, the mirror substrates are generally made with an unknown wedge angle between their faces. Therefore, when the light enters the substrate of the second mirror it is refracted which distorts the reading of the autocollimator so that when an alignment of the mirror is indicated, the mirror is actually slightly misaligned. It therefore becomes necessary to use two autocollimators to determine the wedge angle and compensate for the refraction of the light beam during alignment of the laser mirror. The use of two autocollimators complicates the alignment procedure increasing both the expense and the time required to align a conventional laser tube.

SUMMARY OF THE INVENTION

A mirror is aligned on a laser tube using an apparatus comprising a window and a means for containing a fluid between the window and the mirror. The window and the flluid have an index of refraction that matches that of the mirror. In aligning the laser using this apparatus, the longitudinal axis of the laser tube is aligned with the path of the light beam from an autocollimator. The mirror is then positioned on one end of the laser tube so that the reflective coating on one of its surfaces is toward the tube. The window is spaced from the mirror and is oriented normal to the path of the light beam. A fluid having an index of refraction which matches that of the mirror and the window is placed between the two. The light beam is then passed through the window, refractive index matching fluid and the mirror substrate. The light beam is reflected from the rear surface of the reflective coating on the mirror. The mirror is then oriented on the end of the laser tube so that the beam is being reflected back along its path of transmission.

DETAILED DESCRIPTION OF THE INVENTION

Figure 1:
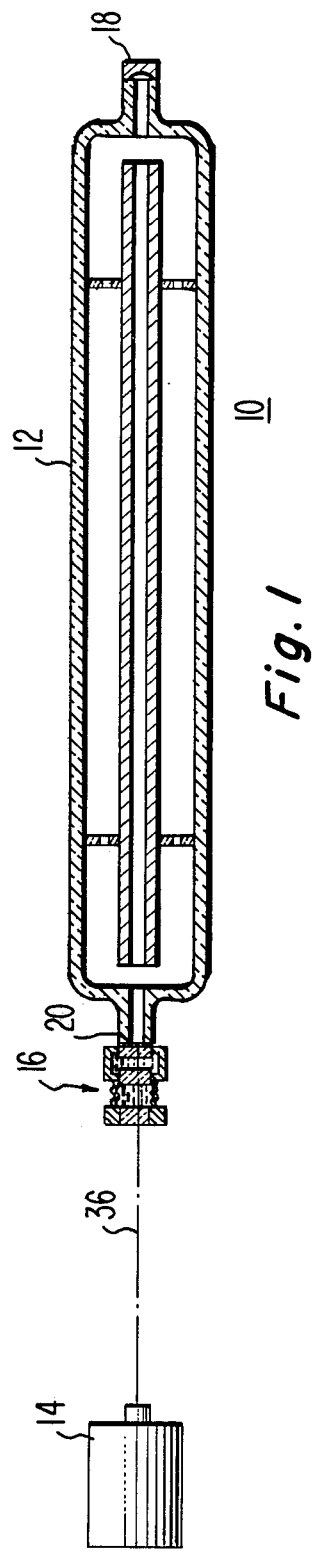
FIG. 1 is a sectional view of the alignment of a laser.

With initial reference to FIG. 1 the mirrors 18 and 20 of a laser 10 may be aligned using an autocollimator 14 and an alignment apparatus generally designated as 16. The first and second mirrors 18 and 20 respectively are mounted at opposite ends of a laser tube 12. The first mirror 18 has been previously aligned normal to the longitudinal axis of the laser tube using conventional aligning techniques. The alignment apparatus 16 is employed to position the second laser mirror 20. The second laser mirror 20 may have either a flat or spherical shape and consists of a mirror substrate 21 having one of its surfaces coated with a reflective material 34, as shown in FIG. 2.

Figure 2:
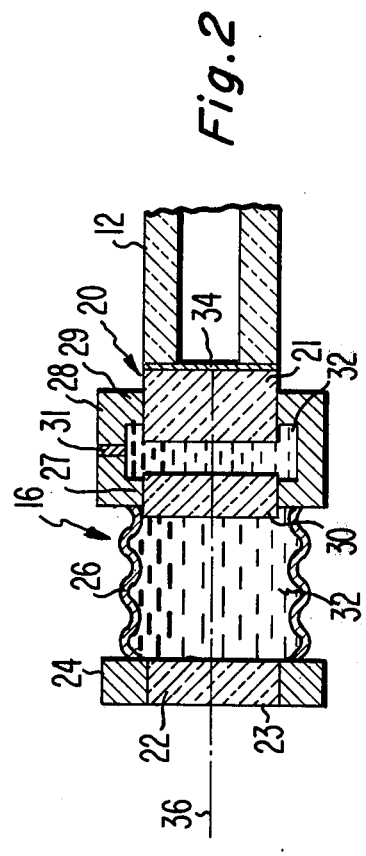
FIG. 2 is a cross sectional view of a portion of the apparatus for aligning the tube as shown in FIG. 1.

With reference to FIG. 2, the laser alignment apparatus 16 has a first window 22 having an index of refraction which substantially matches that of the second mirror substrate 21. The first window 22 is secured in the aperture of a first ring 24. A tubular bellows 26 has one end attached to the first ring 24 and its other end attached to a second ring 28. The second ring 28 has a tubular shape with radially inwardly extending flanges 27 and 29 at each end. The first flange 27 fits around and is secured to a second window 30. The second window 30 has an index of refraction which also substantially matches that of the second mirror substrate 21. The second flange 29 fits around the second mirror 20. A fluid 32, having an index of refraction that substantially matches that of the second mirror substrate 21, is within the bellows 26 between the first window 22 and the second window 30. The fluid 32 is also between the second window 30 and the mirror 20. A pluggable aperture 31 may be used to fill the second ring with fluid.

In aligning the second mirror 20 with the laser tube 12, the longitudinal axis of the laser tube 12 is initially aligned with the light beam 36 from the autocollimator 14. The second laser mirror 20 is then positioned on the end of the laser tube so that the reflective coating 34 of the second mirror is toward the laser tube 12. The laser alignment apparatus 16 is attached to the second mirror 20. The exposed surface 23 of the first window 22 is then positioned normal to the path of the light beam 36. Although the first window 22 is essentially transparent, a small amount of the light which impinges upon the exposed surface 23 will be reflected. The normal orientation is indicated by the autocollimator 14 when the incident path of the light beam 36 coincides with the reflected light beam from the exposed surface 23. A fixture (not shown) is used to maintain the first window 22 in this orientation. Next, the beam from the autocollimator 14 is shone through the first window 22, the index matching fluid 32 in the bellows 26 and into the second window 30. From there the light beam 36 travels through the fluid 32 in the second ring 28 and enters the second mirror 20. The beam 36 is reflected by the surface of the reflective coating 34 which is in contact with the mirror substrate 21 and then back through the second mirror 20 the index matching fluid 32 and the first and second windows 22 and 30. The second mirror 20 is then oriented on the end of the laser tube 12 until the autocollimator 14 indicates that the paths of the incident and reflected light beams coincide. The second mirror is then fixed in place, by cementing it to the tube 12 for example. The bellows 26 enables the orientation of the second mirror 20 on the end of the laser tube 12 without disturbing the position of the first window 22.

The present laser alignment apparatus offers several improvements over prior art methods of aligning lasers. The alignment apparatus has eliminated the refraction of the autocollimator beam due to the wedge angle of the second mirror 20 and thereby eliminated the resultant alignment error. The only interface at which refraction can occur is the exposed surface 23 of the first window 22. Refraction of the beam will not occur since the surface 23 has been oriented normal to the path of the autocollimator light beam 36. Since the other elements of the apparatus have an index of refraction which matches that of the second mirror 20, refraction will not occur as the light beam passes through the other interfaces of the alignment apparatus 16. Thus refraction caused by the mirror wedge angle has been eliminated. The apparatus 16 allows the second mirror to be positioned with respect to the laser tube 12 without destroying the relationship of the first window 22 normal to the path of the light beam 36. Therefore, the second mirror may be oriented without any refraction of the light thereby enabling the use of a single autocollimator to align the laser.

The aapparatus 16 may be simplified by eliminating the second window 30 and the second ring 28 and connecting that bellows 26 directly to the second mirror 20. However, the preferred embodiment shown in the drawing has the advantage of allowing the apparatus to be connected and disconnected from the second laser mirror without an appreciable loss of index matching fluid. Only the small amount of fluid between the second window 30 and the mirror 20 will be lost.

I claim:

1. An apparatus for aligning a first mirror which includes a substrate on a laser tube so that it is parallel with respect to a second mirror on the laser tube comprising:
   a first window having an index of refraction which matches that of the first mirror substrate; and
   means for connecting said first window to said first mirror substrate with said first window being exterior of the laser tube, said means for connecting including
   means for containing a fluid between the first window and said first mirror substrate and means for changing the position of said first mirror substrate with respect to the first window.

2. The apparatus as in claim 1 wherein the means for containing a fluid comprises a bellows extending between the first window and the first mirror substrate.

3. The apparatus as in claim 2 wherein the means for containing a fluid further comprises:
   a second window at the opposite end of the bellows from the first window and having an index of refraction matching that of the first mirror substrate; and
   means for attaching the first mirror substrate to the second window and for containing fluid therebetween.

4. The apparatus as in claim 3 wherein the means for attaching the first mirror substrate and the second window comprises a tubular ring having an inwardly extending flange at each end, the second window being secured within the aperture of the flange at one end and the first mirror substrate being secured within the aperture of the other flange.

5. The apparatus as in claim 4 including a fluid having an index of refraction which matches that of the first mirror substrate, the fluid being within the bellows between the first and second windows and within the ring between the second window and the first mirror substrate.

6. The apparaus as in claim 1 including a fluid having an index of refraction which matches that of the first mirror substrate, the fluid being between the first window and the first mirror substrate.

7. A method of aligning a mirror on an end of a laser tube, the mirror comprised of a substrate having a reflective coating on one surface, the method comprising:
   aligning a light beam with the longitudinal axis of the laser tube;
   positioning a window normal to the light beam and spaced from the end of the laser tube, the window having an index of refraction which substantially matches that of the mirror substrate;
   positioning the mirror at the end of the laser tube so that one surface is nearest the tube and so that the light beam is reflected by the surface of the reflective coating which is in contact with the substrate;
   placing fluid between and in contact with both the mirror and the window, the fluid having an index of refraction which substantially matches that of the mirror substrate; and
   adjusting the orientation of the mirror so that the paths of the incident, and reflected beams coincide.

* * * * *